(12) United States Patent
Kikuchi et al.

(10) Patent No.: US 7,247,663 B2
(45) Date of Patent: *Jul. 24, 2007

(54) ECO TIRE

(75) Inventors: Naohiko Kikuchi, Kobe (JP); Kazuo Hochi, Kobe (JP); Takuya Horiguchi, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 122 days.

This patent is subject to a terminal disclaimer.

(21) Appl. No.: 10/226,114

(22) Filed: Aug. 23, 2002

(65) Prior Publication Data

US 2003/0100661 A1    May 29, 2003

(30) Foreign Application Priority Data

Aug. 24, 2001    (JP) .............................. 2001-254608

(51) Int. Cl.
*C08K 5/15* (2006.01)
*C08K 3/36* (2006.01)

(52) U.S. Cl. .......................... 524/56; 524/57; 524/493; 152/151

(58) Field of Classification Search ................ 524/447, 524/445, 430, 451, 493, 442, 436, 433, 425, 524/56

See application file for complete search history.

(56) References Cited

U.S. PATENT DOCUMENTS 3,697,364 A * 10/1972 Boustany et al. ........... 428/107
5,059,636 A * 10/1991 Grenga ....................... 523/166
5,672,639 A *  9/1997 Corvasce et al. ............. 524/52
5,988,248 A * 11/1999 Sandstrom ................... 152/524
6,279,633 B1 *  8/2001 Corvasce ..................... 152/525
6,344,506 B2 *  2/2002 Vasseur ....................... 524/91
6,759,456 B2 *  7/2004 Kikuchi ....................... 524/81
2005/0236084 A1 * 10/2005 Kikuchi et al. .............. 152/450

FOREIGN PATENT DOCUMENTS

| EP | 0 775 719 | * | 5/1997 |
| EP | 0 794 073 A2 | | 9/1997 |
| EP | 0 943 466 A2 | | 9/1999 |
| EP | 0 988 999 A2 | | 3/2000 |
| EP | 1 074 582 A1 | | 2/2001 |
| GB | 1 166 846 | | 10/1969 |
| JP | 7-258476 A | | 10/1995 |
| JP | 8-275793 A | | 10/1996 |
| JP | 2001-512167 A | | 8/2001 |

* cited by examiner

*Primary Examiner*—Tae H Yoon
(74) *Attorney, Agent, or Firm*—Birch, Stewart, Kolasch & Birch, LLP

(57) ABSTRACT

An earth-friendly tire using raw materials derived from non-petroleum resources instead of all or part of raw materials derived from petroleum resources currently used for tires. The tire is prepared by using a natural rubber instead of a synthetic rubber; an inorganic filler and/or a biofiller instead of carbon black; vegetable oil instead of petroleum oil; and natural fiber instead of synthetic fiber so that the tire comprises a non-petroleum raw material in an amount of at least 75% by weight based on the total weight of the tire.

4 Claims, No Drawings

ECO TIRE

BACKGROUND OF THE INVENTION

The present invention relates to an eco tire comprising raw materials derived from non-petroleum resources.

More than half of the whole weight of a tire on the market today is made of raw materials derived from petroleum resources. For example, a common radial tire for automobiles is made of about 20% by weight of a synthetic rubber, about 20% by weight of carbon black based on the total weight of a tire, and other components such as an aromatic oil and a synthetic fiber, which means that such a tire contains more than 50% of petroleum raw materials based on the total weight.

However, it seems that there is a limit for using raw materials derived from petroleum resources considering recent serious interests to ecological problems and $CO_2$ emission control, as well as forecasted rising of petroleum price caused by limited reserve and declining production of petroleum.

In view of the above problems, an object of the present invention is to provide an eco tire by using raw materials derived from non-petroleum resources instead of all or part of conventional raw materials for tire derived from petroleum resources.

SUMMARY OF THE INVENTION

That is, the present invention relates to a tire comprising a raw material derived from non-petroleum resources in an amount of at least 75% by weight based on the total weight of the tire.

It is preferable to use a natural rubber, an inorganic filler and/or biofiller, a vegetable oil, and a natural fiber as raw materials derived from non-petroleum resources.

DETAILED DESCRIPTION

More than half of the whole weight of a tire on the market today is made of raw materials derived from petroleum resources. For example, synthetic rubbers used as a rubber component, such as styrene-butadiene rubber (SBR), butadiene rubber (BR) and butyl rubber (IIR) are prepared by polymerizing the monomers extracted from the $C_4$ fractions obtained by naphtha cracking of crude petroleum. Carbon black used as a filler is prepared by atomization and heat decomposition of crude petroleum under atmosphere where bunker oil is burned. Petroleum oils used as a process oil, such as aromatic oil, naphthene oil and paraffin oil are heavy oil components obtained by atomospheric distillation of crude petroleum. Polyester, a synthetic fiber used for case cord and others, is prepared by polycondensation of ethylene glycol with dimethyl terephtalate or terephthalic acid, where ethylene glycol is obtained from ethylene and dimethyl terephtalate or terephthalic acid is obtained from paraxylene, both ethylene and paraxylene being refined from crude petroleum. Waxes, antioxidants, resins, adhesives and vulcanization accelerators are also prepared from petroleum resources.

According to the present invention, an eco-tire (ecology-conscious tire) comprising at least 75% by weight, preferably at least 85% by weight, and more preferably at least 95% by weight of non-petroleum raw materials is achieved by using non-petroleum raw materials instead of petroleum raw materials such as synthetic rubbers, carbon black, petroleum oils and synthetic fibers. When the amount of the non-petroleum raw materials is less than 75% by weight, effect of reducing the consumption of petroleum resources remains small. Among petroleum raw materials, synthetic rubber and carbon black are main components of a tire, and thus it is preferable to use non-petroleum raw materials instead of these components. Analyzed part by part, tread contains petroleum raw materials the most, which amounts to about 23% of the whole weight of a tire. Then, side wall, case topping, inner liner, breaker topping and bead follow in order, and therefore it is preferable to use non-petroleum raw materials instead of petroleum raw materials in these parts. Herein, examples of raw materials derived from non-petroleum resources include vegetable resources, minerals, coal, natural gas, shells, eggshell, crushed bone and crustacean shells.

Examples of non-petroleum raw materials used instead of synthetic rubber are a natural rubber and a modified natural rubber obtained by modifying a natural rubber. It is preferable that at least 75% by weight, further at least 85% by weight of synthetic rubber is replaced by natural rubber. When the replacement by natural rubber is less than 75% by weight, effect of reducing the consumption of petroleum resources remains small and rolling resistance tends to increase.

Examples of non-petroleum raw materials used instead of carbon black are inorganic fillers such as silica, sericite, calcium carbonate, clay, alumina, talc, magnesium carbonate, aluminium hydroxide, magnesium hydroxide, magnesium oxide and titanium oxide; and biofillers including vegetable polysaccharides such as starch and cellulose and animal polysaccharides such as chitin and chitosan. Among them, silica is preferable in order to ensure the reinforcement of rubber.

When silica is used, it is preferable that silica has a BET specific surface area of 150 to 250 $m^2/g$. When the BET specific surface area of silica is less than 150 $m^2/g$, reinforcing property tends to be inferior. When the BET specific surface area of silica is more than 250 $m^2/g$, there is a tendency that dispersibility is inferior, agglomerattion is caused and thus a tire has decreased physical properties.

It is preferable that at least 75% by weight, further at least 85% by weight of carbon black is replaced by an inorganic filler and/or a biofiller. When the total amount of the inorganic filler and the biofiller is less than 75% by weight, effect of reducing the consumption of petroleum resources remains small and rolling resistance tends to increase.

When the inorganic filler is used instead of carbon black, it is preferable to use a silane coupling agent together. There is no particular limit for the kind of silane coupling agent as long as it is currently used in the field of production of tires. Examples of silane coupling agents are bis(3-triethoxysilylpropyl)tetrasulfide, bis(3-trimethoxysilylpropyl)tetrasulfide, bis(2-triethoxysilylpropyl)tetrasulfide, 3-mercaptopropyltriethoxysilan and 2-mercaptoethyltrimethoxysilane. These silane coupling agents may be used alone or in any combination. Among them, bis(3-triethoxysilylpropyl)tetrasulfide and 3-mercaptopropyltriethoxysilan are preferable from the viewpoint of reinforcing property and processability, and bis(3-triethoxysilylpropyl)tetrasulfide is particularly preferable from the viewpoint of processability.

When silane coupling agent is used together with an inorganic filler, it is preferable to use 3 to 20% by weight of silane coupling agent based on the inorganic filler. When the amount of silane coupling agent is less than 3% by weight, the effect of adding silane coupling agent is insufficient.

When the amount of silane coupling agent is more than 20% by weight, the effect to be obtained remains small in spite of cost increase.

Examples of non-petroleum raw materials used instead of petroleum oils include vegetable oils such as castor oil, cotton seed oil, linseed oil, rape seed oil, soya bean oil, palm oil, cocoanut oil, arachis oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil and tung oil. Among them, rape seed oil, palm oil and cocoanut oil are preferable from the viewpoint of their supply, price and softening effect.

Among these vegetable oils, preferable examples are oils having low unsaturation degree, such as semi-drying oils having an iodine number of 100 to 130, and non-drying oil or solid oil having an iodine number of at most 100. Herein, the iodine number is defined as the amount of iodine based on gram, which can be absorbed by 100 g of oil. When the iodine number of the oil is more than 130, there is a tendency that tan δis increased and hardness is decreased to cause increase of rolling resistance and decrease of steering stability.

It is preferable that at least 75% by weight, further at least 85% by weight of petroleum oil is replaced by vegetable oil. When the amount of vegetable oil is less than 75% by weight, effect of reducing the consumption of petroleum resources remains small and rolling resistance tends to increase.

It is preferable to blend vegetable oil so that the hardness of rubber becomes 40 to 90 after vulcanization. When the hardness of rubber is less than 40, there is a tendency that required rigidity cannot be achieved. When the hardness of rubber is more than 90, processability tends to be inferior.

Examples of non-petroleum raw materials used instead of synthetic fiber include rayon and acetate which are made from wood pulp, and cupro which is made from cotton seed crude linter. Among them, rayon is preferable because of its high strength required for a tire.

The tire of the present invention can be prepared according to a conventional method, but non-petroleum raw materials is used instead of all or part of the petroleum raw materials which has been used so far.

EXAMPLES

The present invention is explained in detail based on Examples below, but not limited thereto. "Part(s)" and "%" in the following examples mean "part(s) by weight" and "% by weight", respectively, unless otherwise specified.

Materials used in Examples and Comparative Examples are summarized below.

[Raw Materials Derived from Petroleum Resources]
SBR: SBR1502 available from Sumitomo Chemical Co., Ltd.
BR: BR150B available from Ube Industries, Ltd.
IIR: C1-IIR1068 available from Exxon Chemical Japan Ltd.
Carbon black (ISAF): Diablack I available from Mitsubishi Chemical Corporation
Carbon black (FEF): Diablack E available from Mitsubishi Chemical Corporation
Carbon black (GPF): Diablack G available from Mitsubishi Chemical Corporation
Carbon black (HAF): Diablack HA available from Mitsubishi Chemical Corporation
Carbon black (LM-HAF): Diablack LH available from Mitsubishi Chemical Corporation
Aromatic oil: Process X-140 available from Japan Energy Corporation
Mineral oil: Diana Process PA32 available from Idemitsu Kosan Co., Ltd.
Wax: Ozoace 0355 available from Nippon Seiro Co., Ltd.
Antioxidant: Antigen 6C available from Sumitomo Chemical Co., Ltd.
Cured resin: Sumilite resin PR12686 available from Sumitomo Bakelite Co., Ltd.
Adhesive (COST): COST-F available from Japan Energy Corporation
Adhesive (S.620): Sumicanol 620 available from Sumitomo Chemical Co., Ltd.
Vulcanization Accelerator: Nocceler NS available from Ohuchi Shinko Kagaku Kogyo Co., Ltd.

[Raw Materials Derived from Non-petroleum Resources]
Natural rubber: RSS#3
Silica: Ultrasil VN3 available from Degussa Hules Co.
Coupling Agent: Si-69 available from Degussa Hules Co.
Sericite: KM-S available from Nippon Forum Co., Ltd.
Calcium carbonate: Hakuenka CC available from SHIRAISHI KOGYO KAISHA LTD.
Vegetable oil: Purified palm oil J(S) available from Nisshin Oil Mills, Ltd.
Stearic Acid: Stearic acid Tsubaki available from NOF Corporation
Zinc oxide: Zinc Oxide available from Mitsui Mining and Smelting Co., Ltd.
Sulfur: powdery sulfur available from Tsurumi Chemicals Co., Ltd.

Example 1

Kneading was carried out according to compounds listed in Table 1, and tread A (40% of the tire weight), side wall A (17% of the tire weight), inner liner A (8% of the tire weight), clinch apex A (3% of the tire weight), bead apex A (5% of the tire weight), breaker topping A (8% of the tire weight) and carcass ply topping A (3% of the tire weight) were formed. Steel cord (8% of the tire weight) was used for the breaker, and cord (5% of the tire weight) made of 1840 dtex/2 rayon was used for the carcass ply.

An unvulcanized tire was prepared by assembling the above components and other parts (3% of the tire weight) on a tire forming machine in a usual manner, and the tire was heated and pressed in a vulcanizing machine to obtain an eco-tire comprising 97% by weight of non-petroleum raw materials (tire size: 195/65R15 91S).

Comparative Example 1

Kneading was carried out according to compounds listed in Table 1, and tread B, side wall B, inner liner B, clinch apex B, bead apex B, breaker B and carcass ply B were formed. A conventional tire comprising 44% of non-petroleum raw materials was prepared in the same manner as in Example 1 except that a cord made of 1670 dtex/2 polyester was used for the carcass ply.

TABLE 1

| Compound (part by weight) | Tread A | Tread B | Side wall A | Side wall B | Inner liner A | Inner liner B | Clinch apex A | Clinch apex B | Bead apex A | Bead apex B | Breaker topping A | Breaker topping B | Carcass ply topping A | Carcass ply topping B |
|---|---|---|---|---|---|---|---|---|---|---|---|---|---|---|
| SBR | — | 80 | — | — | — | — | — | — | — | 30 | — | — | — | 30 |
| BR | — | — | — | 60 | — | — | — | 70 | — | — | — | — | — | — |
| IIR | — | — | — | — | — | 70 | — | — | — | — | — | — | — | — |
| Natural rubber | 100 | 20 | 100 | 40 | 100 | 30 | 100 | 30 | 100 | 70 | 100 | 100 | 100 | 70 |
| ISAF | — | 80 | — | — | — | — | — | 65 | — | — | — | — | — | — |
| FEF | — | — | — | 50 | — | — | — | — | — | — | — | — | — | — |
| GPF | — | — | — | — | — | 65 | — | — | — | — | — | — | — | — |
| HAF | — | — | — | — | — | — | — | — | — | 70 | — | — | — | 45 |
| LM-HAF | — | — | — | — | — | — | — | — | — | — | — | 60 | — | — |
| Silica | 85 | 10 | 55 | — | 60 | — | 60 | — | 70 | — | 60 | — | 50 | — |
| Coupling agent | 6.8 | 0.8 | 4.0 | — | 4.8 | — | 4.8 | — | 5.6 | — | 4.8 | — | 4.0 | — |
| Sericite | — | — | — | — | 20 | — | 20 | — | — | — | — | — | — | — |
| Calcium carbonate | — | — | — | — | — | 20 | — | — | — | — | — | — | — | — |
| Aromatic oil | — | 45 | — | 5 | — | 9 | — | 8 | — | 5 | — | — | — | 9 |
| Mineral oil | — | — | — | — | — | 9 | — | — | — | — | — | 5 | — | — |
| Vegetable oil | 30 | — | 5 | — | 9 | — | 8 | — | 5 | — | 5 | — | 9 | — |
| Wax | 1.20 | 1.20 | 1.20 | 1.20 | — | — | 1.20 | 1.20 | — | — | — | — | — | — |
| Antioxidant | 1.50 | 1.50 | 1.50 | 1.50 | 1.50 | 1.00 | 1.50 | 1.50 | — | — | 2.00 | 2.00 | — | — |
| Cured resin | — | — | — | — | — | — | — | — | 15.00 | 15.00 | — | — | — | — |
| Adhesive (COST) | — | — | — | — | — | — | — | — | — | — | 1.00 | 1.00 | — | — |
| Adhesive (S.620) | — | — | — | — | — | — | — | — | — | — | 1.00 | 0.00 | — | — |
| Stearic acid | 2.50 | 2.50 | 2.50 | 2.50 | 1.50 | 1.50 | 2.50 | 2.50 | 2.50 | 2.50 | — | — | 2.50 | 2.50 |
| Zinc oxide | 3.00 | 3.00 | 3.00 | 3.00 | 4.00 | 4.00 | 3.00 | 3.00 | 4.00 | 4.00 | 8.00 | 8.00 | 5.00 | 5.00 |
| Sulfur | 1.50 | 1.50 | 1.50 | 1.50 | 0.75 | 0.75 | 1.80 | 1.80 | 3.00 | 3.00 | 5.00 | 5.00 | 3.00 | 3.00 |
| Vulcanization accelerator | 2.30 | 2.30 | 0.70 | 0.70 | 1.30 | 1.30 | 2.10 | 2.10 | 3.85 | 3.85 | 2.15 | 1.00 | 1.00 | 1.00 |

The tires prepared in Example and Comparative Example were subjected to the following durability test and performance evaluations.

1) High Speed Durability

Evaluation of high speed durability was carried out in accordance with JIS D4230 "tire for automobiles" S range high speed durability test A.

2) Rolling Resistance Coefficient (RRC)

Rolling resistance was measured under the condition of speed of 80 km/h, air pressure of 250 kPa and load of 4.0 kN. Rolling resistance coefficient was obtained by dividing the rolling resistance value with the load value, and multiplying the result by $10^4$. The smaller the coefficient is, the lower and the more excellent the heat build-up characteristic is.

3) Braking Test

Friction coefficient μ was determined from the brake stopping distance, which was measured by stopping the automobile mounted with the prepared tire, running at a speed of 100 km/h on dry asphalt road and wet asphalt road. The friction coefficient μ is represented as an index to the μ value of Comparative Example 1 as 100.

4) Evaluation Test on Real Automobile

Grip, rigidity and riding comfort characteristics were evaluated by using a real automobile with an engine size of 2000 cc, which was mounted with the prepared tire and run on dry asphalt road and wet asphalt road in a test course. The results are represented in score based on the value of Comparative Example 1 as 6. The higher the score is, the better the properties are. Only well-trained drivers can detect the score difference of 0.5 point.

The results are shown in Table 2. Table 2 shows that the eco-tire of Example 1 has smaller rolling resistance, better fuel consumption and equally excellent high speed durability and other properties compared with the conventional tire of Comparative Example 1.

TABLE 2

| Test | Ex. 1 | Com. Ex. 1 |
|---|---|---|
| High speed durability | Passed | Passed |
| RRC | 80 | 91 |
| Braking test | | |
| Dry μ (index) | 90 | 100 |
| Wet μ (index) | 90 | 100 |
| Organoleptic test on automobile | | |
| Dry grip (score) | 5.5 | 6 |
| Wet grip (score) | 5.5 | 6 |
| Rigidity (score) | 5.5 | 6 |
| Riding comfort (score) | 5.5 | 6 |

According to the present invention, a new and earth-friendly tire in anticipation of decline of petroleum supply can be prepared by using a natural rubber instead of a synthetic rubber, an inorganic filler and/or a biofiller instead of carbon black, vegetable oil instead of petroleum oil, and natural fiber instead of synthetic fiber so that the tire comprises a non-petroleum raw materials in an amount of at least 75% by weight based on the total weight of the tire.

What is claimed is:

1. A tire comprising a raw material derived from a non-petroleum resource in an amount of at least 75% by weight based on the total weight of said tire; and
    at least 75% by weight of all of tread, sidewall, case topping, inner liner, breaker topping and bead members of said tire are composed of a raw material derived from a non-petroleum resource containing:
        a natural rubber,
        an inorganic filler and/or a biofiller, and
        a vegetable oil,
    wherein said biofiller is a vegetable polysaccharide or an animal polysaccharide, and a non-petroleum raw material is used instead of synthetic fiber and is used for a carcass cord of said tire.

2. The tire of claim 1, wherein the non-petroleum raw material is a natural fiber.

3. The tire of claim 1, wherein said vegetable or animal polysaccharide is at least one selected from the group consisting of starch, cellulose, chitin and chitosan.

4. A tire comprising raw materials derived from non-petroleum resources, wherein at least 75% by weight of all of a tread, sidewall, case topping, inner liner, breaker topping and bead members of said tire comprises a raw material derived from a non-petroleum resource containing:

a natural rubber, an inorganic filler and/or a biofiller of a vegetable polysaccharide or an animal polysaccharide, and a vegetable oil;

wherein a carcass cord of said tire comprises a raw material derived from a non-petroleum resource; and wherein at least 75% by weight based on the total weight of said tire has the raw materials derived from non-petroleum resources.

* * * * *